United States Patent
Kim

(10) Patent No.: US 10,469,415 B2
(45) Date of Patent: *Nov. 5, 2019

(54) APPARATUS FOR PROVIDING DOCUMENT SHARING SERVICE BASED ON MESSAGING SERVICE, AND METHOD USING THE APPARATUS

(71) Applicant: LINE Corporation, Shinjuku-ku (JP)

(72) Inventor: Keum Ryong Kim, Seongnam-si (KR)

(73) Assignee: LINE Corporation, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 15/919,286

(22) Filed: Mar. 13, 2018

(65) Prior Publication Data

US 2018/0205677 A1  Jul. 19, 2018

Related U.S. Application Data

(63) Continuation of application No. 14/825,798, filed on Aug. 13, 2015, now Pat. No. 9,942,178.

(30) Foreign Application Priority Data

Feb. 9, 2015 (KR) .......................... 10-2015-0019293

(51) Int. Cl.
*G06F 15/16* (2006.01)
*H04L 12/58* (2006.01)
*H04L 12/18* (2006.01)

(52) U.S. Cl.
CPC .......... *H04L 51/04* (2013.01); *H04L 12/1822* (2013.01); *H04L 51/08* (2013.01)

(58) Field of Classification Search
CPC ..... H04L 51/04; H04L 12/1822; H04L 51/08; H04L 12/58; H04L 12/18; G06F 15/16
See application file for complete search history.

(56) References Cited

U.S. PATENT DOCUMENTS

2009/0307325 A1* 12/2009 Szeto .................... G06Q 10/10
709/206
2011/0238761 A1*  9/2011 Mizokami ........... H04L 12/1827
709/206

(Continued)

*Primary Examiner* — Cheikh T Ndiaye
(74) *Attorney, Agent, or Firm* — Harness, Dickey & Pierce, P.L.C.

(57) ABSTRACT

An apparatus for providing a document sharing service based on a messaging service. The apparatus includes a memory configured to store computer readable instructions and a processor configured to execute the computer readable instructions. The processor is configured to execute the computer readable instructions to receive a document transmission signal for transmitting a document displayed in a chat window of a first chat group from a first terminal application corresponding to a member of the first chat group, to a second chat group via second terminal applications respectively corresponding to members of the second chat group, the second chat group being different from the first chat group, obtain a document identifier from the document transmission signal, retrieve a document corresponding to the document identifier, transmit the document to the second terminal applications, and update shared status information of the document in the database based on a shared status of the document in the second chat group. The shared status information includes at least one of a number of users who read the document, and a number of chat groups to which the document is transmitted.

9 Claims, 7 Drawing Sheets

(56) References Cited

U.S. PATENT DOCUMENTS

| | | | |
|---|---|---|---|
| 2013/0198304 A1* | 8/2013 | Jung | H04L 12/1818 709/206 |
| 2014/0095639 A1* | 4/2014 | Noma | H04L 12/1822 709/206 |
| 2014/0173467 A1* | 6/2014 | Clavel | H04L 12/1822 715/758 |
| 2015/0269155 A1* | 9/2015 | Bastide | G06F 16/24578 707/723 |

\* cited by examiner

US 10,469,415 B2

APPARATUS FOR PROVIDING DOCUMENT SHARING SERVICE BASED ON MESSAGING SERVICE, AND METHOD USING THE APPARATUS

CROSS-REFERENCE TO RELATED APPLICATION

This application is a continuation application of U.S. application Ser. No. 14/825,798, filed Aug. 13, 2015, which claims priority under the benefit of Korean Patent Application No. 10-2015-0019293, filed on Feb. 9, 2015, in the Korean Intellectual Property Office, the disclosure of each of which is incorporated herein in its entirety by reference.

BACKGROUND

1. Field

One or more example embodiments relate to an apparatus for providing a document sharing service based on a messaging service, and a method using the apparatus, and for example, to an apparatus for providing a document sharing service based on a messaging service, wherein a user receives a selected document or recognizes a shared status of a document, and a method of using the apparatus.

2. Description of the Related Art

Recently, together with the rapid development of communication networks, such as the Internet, messaging services using communication networks are widely provided. For example, Internet users are able to easily transmit and receive messages to and from other users at anytime and anywhere using the Internet, and such messaging services are bringing about various changes throughout people's lives in general. With the development of mobile communication, messaging services are used as popular methods for communicating across national borders. With messaging services such as mobile messenger applications, the number of users of the messaging services is increasing, and accordingly, the number of messenger-based services is increasing.

Such messenger-based services are services that enable users to deliver information in the form of a conversation. Social network services (SNS), which have recently appeared as an online platform generating/reinforcing social relationships between users by sharing information, additionally provide messaging services between users.

Information disclosed in this Background section was already known to the inventors before achieving the inventive concepts or is technical information acquired in the process of achieving the inventive concepts. Therefore, it may contain information that does not form the prior art that is already known to the public in this country.

SUMMARY

One or more example embodiments may include an apparatus for providing a document sharing service based on a messaging service. The apparatus may include a memory configured to store computer readable instructions and a processor configured to execute the computer readable instructions. The processor may be configured to execute the computer readable instructions to receive a document transmission signal for transmitting a document displayed in a chat window of a first chat group from a first terminal application corresponding to a member of the first chat group, to a second chat group via second terminal applications respectively corresponding to members of the second chat group, the second chat group being different from the first chat group, obtain a document identifier from the document transmission signal, retrieve a document corresponding to the document identifier, transmit the document to the second terminal applications, and update shared status information of the document in the database based on a shared status of the document in the second chat group. The shared status information may include at least one of a number of users who read the document, and a number of chat groups to which the document is transmitted.

The processor may be further configured to execute the computer readable instructions to assign a rank according to a pre-set standard to the document by using the shared status information.

The processor may be further configured to execute the computer readable instructions to determine whether the document is set to be public, and assigns the rank to the document only when the document is set to be public.

The processor may be further configured to execute the computer readable instructions to generate a ranking list including documents which have been assigned a rank and transmits the ranking list to the first terminal application.

The processor may be further configured to execute the computer readable instructions to receive a document transmission signal for transmitting one of the documents included in the ranking list from the first terminal application to the second terminal applications respectively corresponding to the members of the second chat group.

The shared status information may include a number of all users who read the document, and the processor is configured to execute the computer readable instructions to update the number of all users who read the document by collecting an identifier of a member who read the document from among the members of the second chat group.

The processor may be further configured to execute the computer readable instructions to transmit the updated shared status information of the document to the first and second terminal applications, and display the document in a chat window of the second chat group, together with the shared status information of the document.

The processor may be further configured to execute the computer readable instructions to pre-convert the document to a format compatible with the chat window such that the document and an instant message are displayable together in the chat window in the first terminal application.

In other example embodiments a non-transitory computer-readable recording medium storing instructions that, when executed by a processor, cause the processor to, receive a document transmission signal for transmitting a document displayed in a chat window of a first chat group from a first terminal application corresponding to a member of the first chat group, to a second chat group via second terminal applications respectively corresponding to members of the second chat group, the second chat group being different from the first chat group, obtain a document identifier from the document transmission signal, retrieve a document corresponding to the document identifier, transmit the document to the second terminal applications; and update shared status information of the document in the database based on a shared status of the document in the second chat group. The shared status information may include at least one of a number of users who read the document, and a number of chat groups to which the document is transmitted.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
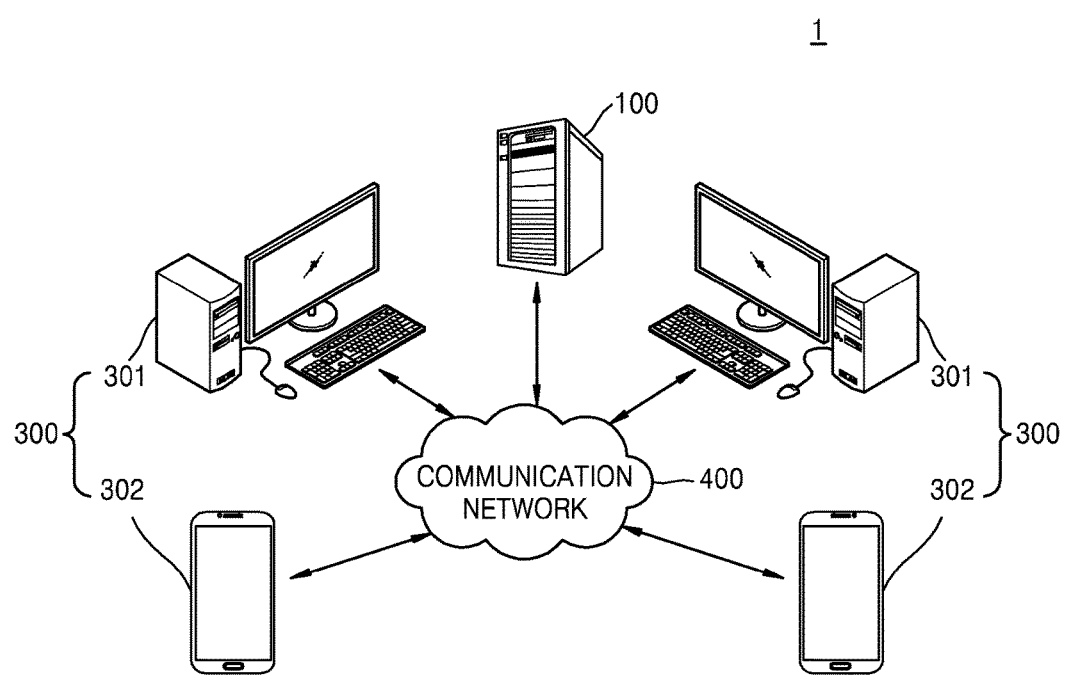
FIG. 1 is a diagram of a system for providing a document sharing service, according to an example embodiment.

The inventive concepts will now be described more fully hereinafter with reference to the accompanying drawings, in which example embodiments of the inventive concepts are shown. The advantages and features of the inventive concepts and methods of achieving them will be apparent from the following example embodiments that will be described in more detail with reference to the accompanying drawings. It should be noted, however, that the inventive concepts are not limited to the following example embodiments, and may be implemented in various forms. Accordingly, the example embodiments are provided only to disclose the inventive concepts and let those skilled in the art know the category of the inventive concepts. In the drawings, example embodiments of the inventive concepts are not limited to the specific examples provided herein and are exaggerated for clarity.

The terminology used herein is for the purpose of describing example embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, example embodiments in the detailed description will be described with sectional views as ideal example views of the inventive concepts. Accordingly, shapes of the example views may be modified according to manufacturing techniques and/or allowable errors. Therefore, example embodiments of the inventive concepts are not limited to the specific shape illustrated in the example views, but may include other shapes that may be created according to manufacturing processes. Areas exemplified in the drawings have general properties, and are used to illustrate specific shapes of elements. Thus, this should not be construed as limited to the scope of the inventive concepts.

It will be also understood that although the terms first, second, third etc. may be used herein to describe various elements, these elements should not be limited by these terms. These terms are only used to distinguish one element from another element. Thus, a first element in some example embodiments could be termed a second element in other example embodiments without departing from the teachings of the present invention. Example embodiments of aspects of the present inventive concepts explained and illustrated herein include their complementary counterparts. The same reference numerals or the same reference designators denote the same elements throughout the specification.

Moreover, example embodiments are described herein with reference to cross-sectional illustrations and/or plane illustrations that are idealized example illustrations. Accordingly, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

As appreciated by the present inventive entity, devices and methods of forming devices according to various example embodiments described herein may be embodied in microelectronic devices such as integrated circuits, wherein a plurality of devices according to various example embodiments described herein are integrated in the same microelectronic device. Accordingly, the cross-sectional view(s) illustrated herein may be replicated in two different directions, which need not be orthogonal, in the microelectronic device. Thus, a plan view of the microelectronic device that embodies devices according to various example embodiments described herein may include a plurality of the devices in an array and/or in a two-dimensional pattern that is based on the functionality of the microelectronic device.

The devices according to various example embodiments described herein may be interspersed among other devices depending on the functionality of the microelectronic device. Moreover, microelectronic devices according to various example embodiments described herein may be replicated in a third direction that may be orthogonal to the two different directions, to provide three-dimensional integrated circuits.

Accordingly, the cross-sectional view(s) illustrated herein provide support for a plurality of devices according to various example embodiments described herein that extend along two different directions in a plan view and/or in three different directions in a perspective view. For example, when a single active region is illustrated in a cross-sectional view of a device/structure, the device/structure may include a plurality of active regions and transistor structures (or memory cell structures, gate structures, etc., as appropriate to the case) thereon, as would be illustrated by a plan view of the device/structure.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

FIG. 1 is a diagram of a system 1 for providing a document sharing service, according to an example embodiment.

Referring to FIG. 1, the system 1 according to an example embodiment includes an apparatus 100 for providing a document sharing service, and a user terminal 300. Also, the system 1 includes a communication network 400 that mutually connects the apparatus 100 and a plurality of the user terminals 300.

The apparatus 100 according to an example embodiment is characterized in that, regarding displaying of an instant message and a document through a chat window of a terminal application executed on the user terminal 300, when a document displayed in a chat window of a first chat group is transmitted to a second chat group, a shared status of the document is updated, thereby facilitating a user to further share the document with other chat groups.

The apparatus 100 according to an example embodiment may be a server providing an instant messaging service.

Also, the apparatus 100 may provide advertisements, general search services, and other various services for a user's convenience, to the user terminal 300, as well as the document sharing and instant messaging services. In other words, the apparatus 100 may provide various services, such as an advertising service, a search service, an email service, a blog service, a social network service (SNS), a new providing service, and/or shopping information providing service in addition to a document sharing service.

Alternatively, the apparatus 100 may be a server that is connected to an instant messaging service providing server so as to provide a document such that the document is displayed in the user terminal 300 that transmits a message through the instant messaging service. The apparatus 100 and the instant messaging service providing server may be physically separate individual servers or may be the same physical server conceptually separated into multiple servers.

A document provided by the apparatus 100 may be any one of a user prepared document that is personally prepared by the user through a terminal application on the user terminal 300, a document provided from a server self-operated by an advertiser, a document provided by a service operator, and/or a converted document generated by automatically converting a document in an external server, such as a webpage. The document may include at least one of text, an emoticon, multimedia content, and a web application program interface (web API).

The multimedia content may include a sound source, an image, and a video.

The web API may be used to receive various web services. For example, the web API may include a postal code API or a map API.

The plurality of user terminals 300 are each a communication terminal capable of using a terminal application in a wired/wireless communication environment. The user terminal 300 may be a personal computer (PC) 301 of a user or a mobile terminal 302 of a user. In FIG. 1, the mobile terminal 302 is illustrated as a smart phone, but an example embodiment is not limited thereto, and a terminal is not limited as long as a terminal application is provided thereon as described above.

For example, the user terminal 300 may include an arbitrary form of a computer (for example, a desktop computer, a laptop, or a tablet PC), a media computing platform (for example, a computer, a satellite set-top box, or a digital video recorder), a handheld computing device (for example, a personal digital assistant (PDA) or an email client), a mobile phone, or another type of computing or communication platform, but is not limited thereto.

The communication network 400 connects the apparatus 100 to the plurality of user terminals 300. In other words, the communication network 400 is a communication network that provides an access path for the user terminals 300 to access the apparatus 100 and then transmit and receive data to and from the apparatus 100. Examples of the communication network 400 may include wired networks, such as a local area network (LAN), a wide area network (WAN), a metropolitan area network (MAN), and an integrated service digital network (ISDN), and wireless networks, such as a wireless LAN, a code division multiple access (CDMA), a Bluetooth, and satellite communication, but are not limited thereto.

Figure 2:
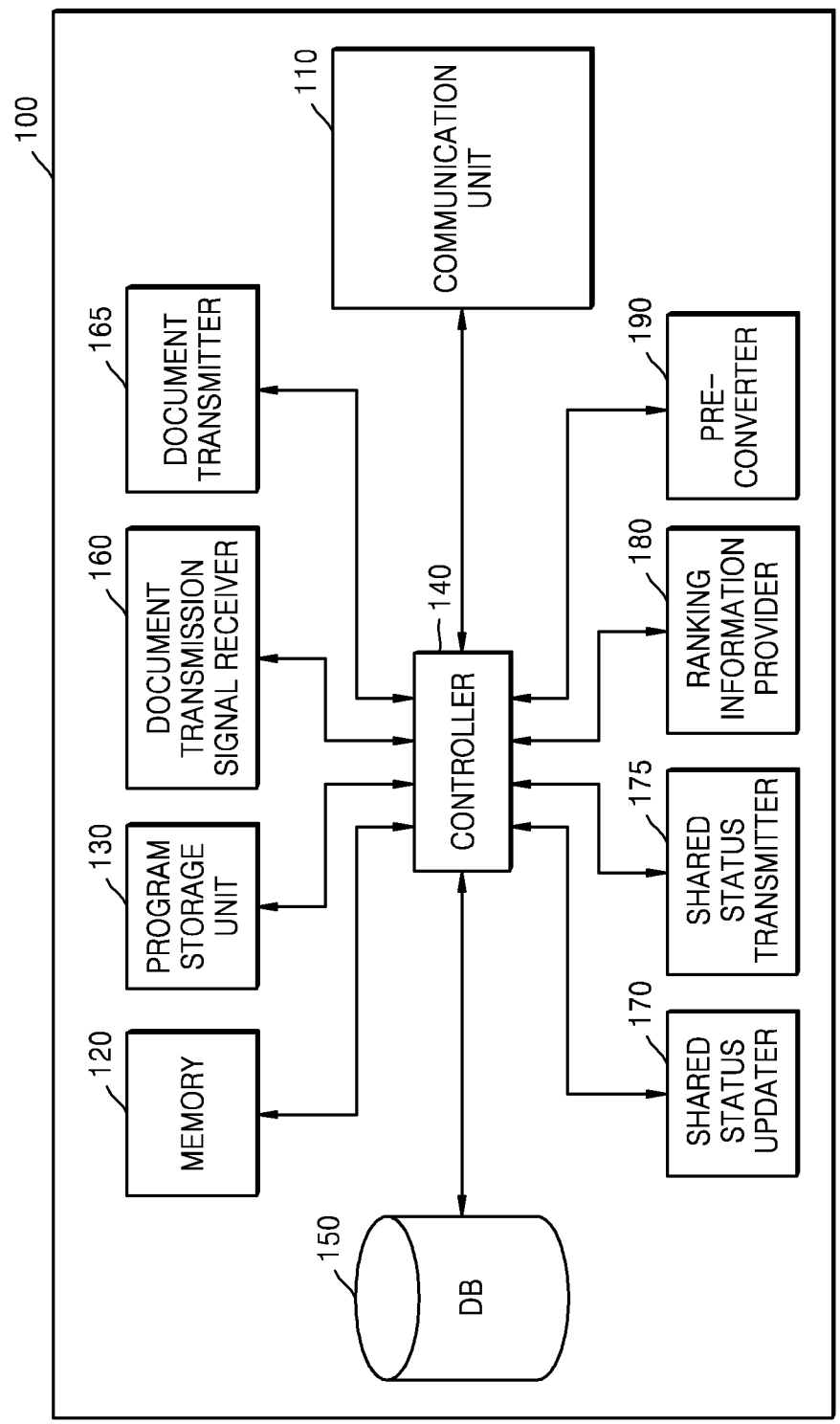
FIG. 2 is an example block diagram of an apparatus for providing a document sharing service of FIG. 1.

FIG. 2 is an example block diagram of the apparatus 100 for providing a document sharing service of FIG. 1.

Referring to FIG. 2, the apparatus 100 of the system 1, according to an example embodiment includes a communication unit 110, a memory 120, a program storage unit 130, a controller 140, a database (DB) 150, a document transmission signal receiver 160, a document transmitter 165, a shared status updater 170, a shared status transmitter 175, a ranking information provider 180, and/or a pre-converter 190.

For example, the communication unit 110 faces with the communication network 400 to provide a communication interface to provide a signal delivered between the apparatus 100 and the user terminal 300, for example, in a packet data form. In addition, the communication unit 100 may receive a chat window update request from the user terminal 300 or transmit a push message for a chat notification.

The communication unit 110 may be an apparatus including hardware and software required to transmit and receive a signal, such as a control signal or a data signal, to and from another network apparatus through wired/wireless connection.

The memory 120 performs a function of temporarily or permanently storing data processed by the controller 140. The memory 120 may include a magnetic storage medium or a flash storage medium, but is not limited thereto.

The program storage unit 130 includes control software that performs a job for searching for a document according to user's request, a job for aggregating a shared status, a job for assigning ranks to documents and generating a ranking list, and a job for pre-converting documents.

The controller 140 is a type of a central processing unit (CPU), and an entire process of receiving a request to transmit a document to a chat groups from the user terminal 300, transmitting a document to the chat group, and updating a shared status. In other words, the controller 140 may provide various functions, such as driving the control software mounted on the program storage unit 130, and upon receiving the request to transmit the document from the user terminal 300, controlling the document transmitter 165, the shared status transmitter 175, and the ranking information provider 180 to transmit a document, a shared status, and a ranking list to the user terminal 300.

The controller 140 may include various types of apparatuses capable of processing data, such as a processor. Here, the 'processor' may be, for example, a data processing apparatus included in hardware, and may perform a function expressed in a code or a command included in a program. Examples of the data processing apparatus included in hardware may include a microprocessor, a CPU, a processor core, a multiprocessor, an application-specific integrated circuit (ASIC), and a field programmable gate array (FPGA), but are not limited thereto.

The DB 150 includes a document DB storing a document provided by the apparatus 100. In addition, the DB 150 may store a document identifier for intrinsically identifying each document, wherein various information related to a document, in addition to details of the document, may be mapped to the document identifier. For example, details of a document, prepared time, a preparer, a shared status, and a document rank may be mapped to one document identifier.

Moreover, the DB 150 may include a user DB storing user information. The user DB stores user information about a user who is to use the document sharing or instant messaging service. The user information may include basic information about the user, such as a name, an affiliation, personal information, a gender, and an age of the user, login information, such as an identification (ID) and a password, access-related information, such as an access country, an access location, an access apparatus, and/or an accessed network environment.

According to an SNS as a general service for sharing a document, when a user selects a document, the selected document is transmitted while being shared with other users, and thus generally, details of the document are limited and it may be difficult for a user to share only a document related to a certain topic or share a document with only a certain user or users. For example, it may be difficult for users of the SNS to determine which document to read from among document posted by other users, since the amount of posted document may increase based on the number of other users. Also, it is difficult for a user who transmits document to determine the number of users who have viewed the document, e.g., a shared status, and thus it is difficult to evaluate the document.

Accordingly, the apparatus 100 according to an example embodiment transmits documents via chat windows of chat groups such that users are exposed only to documents matching interests related to respective chat groups to which the users belong. Also, the apparatus 100 according to an example embodiment accumulates a shared status of a document transmitted through a chat window and provides the shared status together with the document such that a user who shares a document is able to easily determine a shared status of the shared document.

Also, the apparatus 100 according to an example embodiment automatically converts a format of a document according to a chat window such that a user may conveniently view the document.

In addition, the apparatus 100 according to an example embodiment transmits a document by using a document identifier having a smaller size than the document such that the document may be quickly transmitted using less data.

Accordingly, the apparatus 100 further includes the document transmission signal receiver 160, the document transmitter 165, the shared status updater 170, the shared status transmitter 175, the ranking information provider 180, and the pre-converter 190.

The document transmission signal receiver 160 receives a document transmission signal for transmitting a document to a certain chat group from a terminal application, the document transmitter 165 obtains a document identifier from the document transmission signal and then transmits a document corresponding to the document identifier to the certain chat group, the shared status updater 170 updates shared status information based on a shared status in the certain chat group, the shared status transmitter 175 transmits the updated shared status information the certain chat group, the ranking information provider 180 assigns a rank to the document, generates a ranking list according to the rank, and transmits the ranking list to the terminal application, and the pre-converter 190 pre-converts the document such that the document is suitably displayed in a chat window. Such operations will now be described in detail.

The document transmission signal receiver 160 receives a request to transmit a document from the user terminal 300. The request received from the user terminal 300 may include, for example, a request to transmit a document displayed in a chat window of any chat group of a terminal application to another chat group, a request to transmit a popular document to a chat group, and/or a request to transmit a document newly prepared by the user to a chat group.

For example, in order to transmit a document displayed in a chat window of a first chat group to members of a second chat group different form the first chat group, the document transmission signal receiver 160 may receive a document transmission signal regarding the document from a terminal of any one of members of the first chat group. The document transmission signal regarding the document includes a document identifier of the document, and thus the document may be transmitted to the second chat group without having to transmit the document itself to the document transmission signal receiver 160.

For example, the document transmission signal receiver 160 may receive a document transmission signal regarding any one of documents in a ranking list from any one of terminals of the members of the second chat group.

For example, the document transmission signal receiver 160 may receive a document transmission signal regarding a document prepared by the user through a document generator included in a terminal application.

As such, the document transmission signal receiver 160 may receive various transmission signals for, for example, transmitting a document to a chat group, transmitting a listed document to a chat group according to a separate standard, and/or transmitting a document prepared by the user to a chat group.

A document identifier is intrinsically assigned to each document, such as a document displayed in a chat window or a popular document, and when a terminal application transmits a document transmission signal including a document identifier corresponding to a certain document, the document transmission signal receiver 160 receives such a document transmission signal.

When a document is newly prepared through a document generator of a terminal application, the document transmission signal receiver 160 may assign a document identifier to the prepared document upon receiving a document transmission signal of the prepared document.

The document identifier may be mapped to details of the prepared document as well as various types of information related to the prepared document, and then stored in the DB 150.

Also, a chat group includes a chat group identifier that is intrinsically assigned to the chat group, and when a terminal application transmits a document transmission signal including a chat group identifier of a chat group to which a document is to be transmitted, the document transmission signal receiver 160 receives the document transmission signal, and the document transmitter 165 transmits the document to members of the chat group corresponding to the chat group identifier.

The document transmitter 165 obtains a document identifier from the document transmission signal received by the document transmission signal receiver 160, and searches for the document corresponding to the document identifier in the DB 150. The document transmitter 165 further obtains the chat group identifier from the document transmission signal, and transmits a found document to a terminal application corresponding to each member of the chat group corresponding to the chat group identifier.

The shared status updater 170 updates shared status information of documents in the DB 150 based on shared statuses of the documents.

The shared status updater 170 may collect an identifier of a member who read a document from among members of a chat group to which the document is transmitted to update the number of all users who read the document, and may accumulate the number of chat groups to which the document is transmitted to update the number of all chat groups to which the document is transmitted.

The shared status updater 170 may accumulate the number of all users who read a plurality of documents or the number of chat groups to which the plurality of documents are transmitted.

In other words, shared status information may include the number of all users who read a document and the number of all chat groups to which the document is transmitted, and may further include information about a gender and an age of a member who read the document. The shared status information may be statistical information about each document as described above, or about at least two documents.

The shared status transmitter 175 transmits shared status information of documents to a terminal application such that shared statuses of the documents are displayed together with the documents. The shared statuses of the documents may be displayed above or below the documents so as to be distinguished from details of the documents.

The ranking information provider 180 assigns a rank according to a pre-set standard to each of documents by using shared status information of the documents. The ranking information provider 180 generates a ranking list by using the documents, and at this time, the documents are listed based on the rank according to the pre-set standard.

For example, a ranking list may be generated by arranging the documents based on the number of members who read the documents, e.g., by assigning a high rank to a document read by a relatively large number of members, or by arranging the documents based on the number of chat groups which each document is transmitted to, e.g., by assigning a high rank to a document transmitted to a relatively large number of chat groups.

The ranking information provider 180 may determine whether a document is set to be public, and assign a rank to the document only when the document is set to be public. For example, the document is set to 'public' or 'private' by a document preparer. A rank may be assigned to a document set to 'public', but a rank is not assigned to a document set to 'private' and thus such a document may not be included in a popular document list.

The ranking information provider 180 may transmit a ranking list to a terminal application, as a popular document list, and the user may select one of documents displayed in the ranking list, thereby easily transmitting a popular document to chat groups.

According to a general instant messenger, when multimedia content is transmitted, the multimedia content is displayed outside a chat window, for example, a separate web browser is displayed first via a link and then the multimedia content is displayed on the separate web browser or a separate window is opened for the multimedia content, and thus the user may be overwhelmed or inconvenienced by the amount of multimedia content.

Thus, according to an example embodiment, the pre-converter 190 pre-coverts a document to a format of a chat window such that the document and an instant message are displayed together through the chat window in a terminal application, thereby enabling the user to directly read text of the document or view multimedia content in the chat window without having to move to a separate window.

In other words, when a document is prepared, details of the document input by the user may be pre-converted so as to be suitably displayed through a chat window, as well as using a document generator of a terminal application. In this case, when the user copies and pastes the details of the document to the terminal application, the pre-converter 190 may convert the document. The details of the document may be details of a file in a format supportable by the terminal application, details of a webpage, or link information of a webpage.

For example, the pre-converter 190 may generate a document by extracting only a header and a body from a file of a format supported by a terminal application, and pre-converting a text size or an image size forming the body to correspond to a chat window. When the user pastes details of a webpage or link information of a web page to a terminal application, a document may be generated by extracting only a header and a body of the webpage. When a video is transmitted, resolution of the video may be pre-converted to a format compatible with a chat window. As an example of displaying a video in a chat window, when a still image of the video is displayed in a chat window and the user selects the still image, the video converted by the pre-converter 190 may be provided such that the user is able to directly view the video in the chat window.

Figure 3:
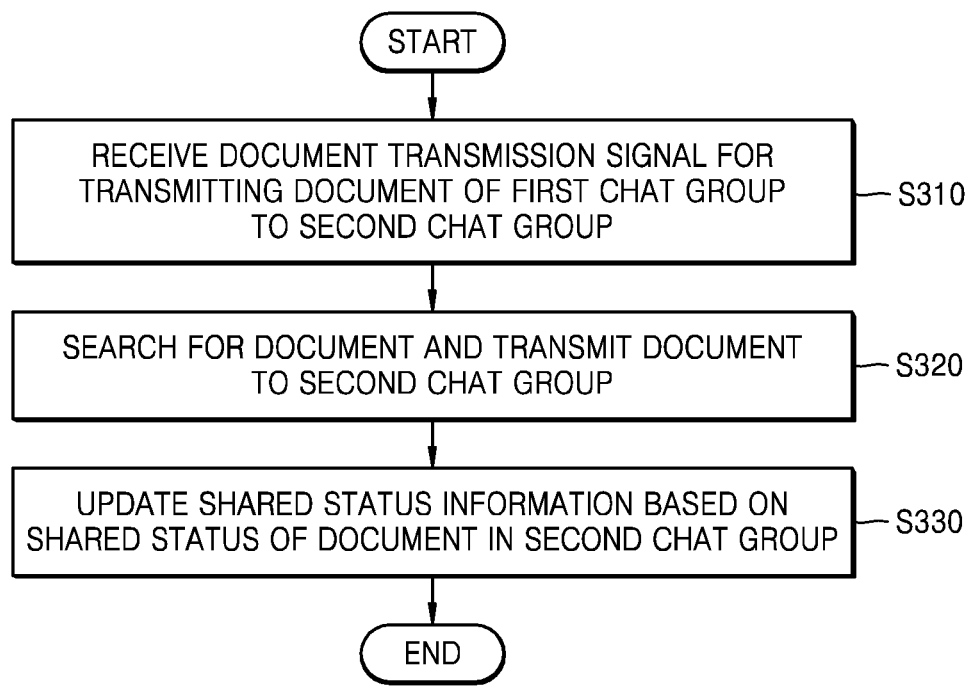
FIG. 3 is a flowchart of a method of providing a document sharing service, according to an example embodiment.

FIG. 3 is a flowchart of a method of providing a document sharing service, according to an example embodiment.

Referring to FIG. 3, the method according to an example embodiment includes receiving a document transmission signal for transmitting a document displayed through a chat window of a first chat group to members of a second chat group different from the first chat group (operation S310), obtaining a document identifier from the document transmission signal, searching for the document corresponding to the document identifier in a DB, and transmitting the document to the second chat group (operation S320), and updating shared status information of the document in the DB based on a shared status of the document in the second chat group (operation S330), wherein the method is performed by the apparatus 100.

First, the apparatus 100 receives the document transmission signal for transmitting the document displayed through the chat window of the first chat group to the members of the second chat group different from the first chat group, from a first terminal application corresponding to one of members of the first chat group, in operation S310.

The apparatus 100 may receive the document transmission signal including a document identifier of the document displayed through the chat window of the first chat group, and a chat group identifier of the second chat group to which the document is to be transmitted.

Then, the apparatus 100 obtains the document identifier from the document transmission signal, searches for the document corresponding to the document identifier in the DB, and transmits the document to second terminal applications respectively corresponding to the members of the second chat group, in operation S320.

The document identifier and the document are mapped to each other and stored in the DB, and instead of directly receiving the document from the first terminal application, only the document identifier may be received through the document transmission signal, and the document mapped to the document identifier may be transmitted to a second chat group via the second terminal application.

Lastly, the apparatus 100 updates the shared status information of the document from the DB based on the shared status of the document in the second chat group, in operation S330.

The document identifier and the shared status information of the document may be mapped to each other and stored in the DB.

Figure 4:
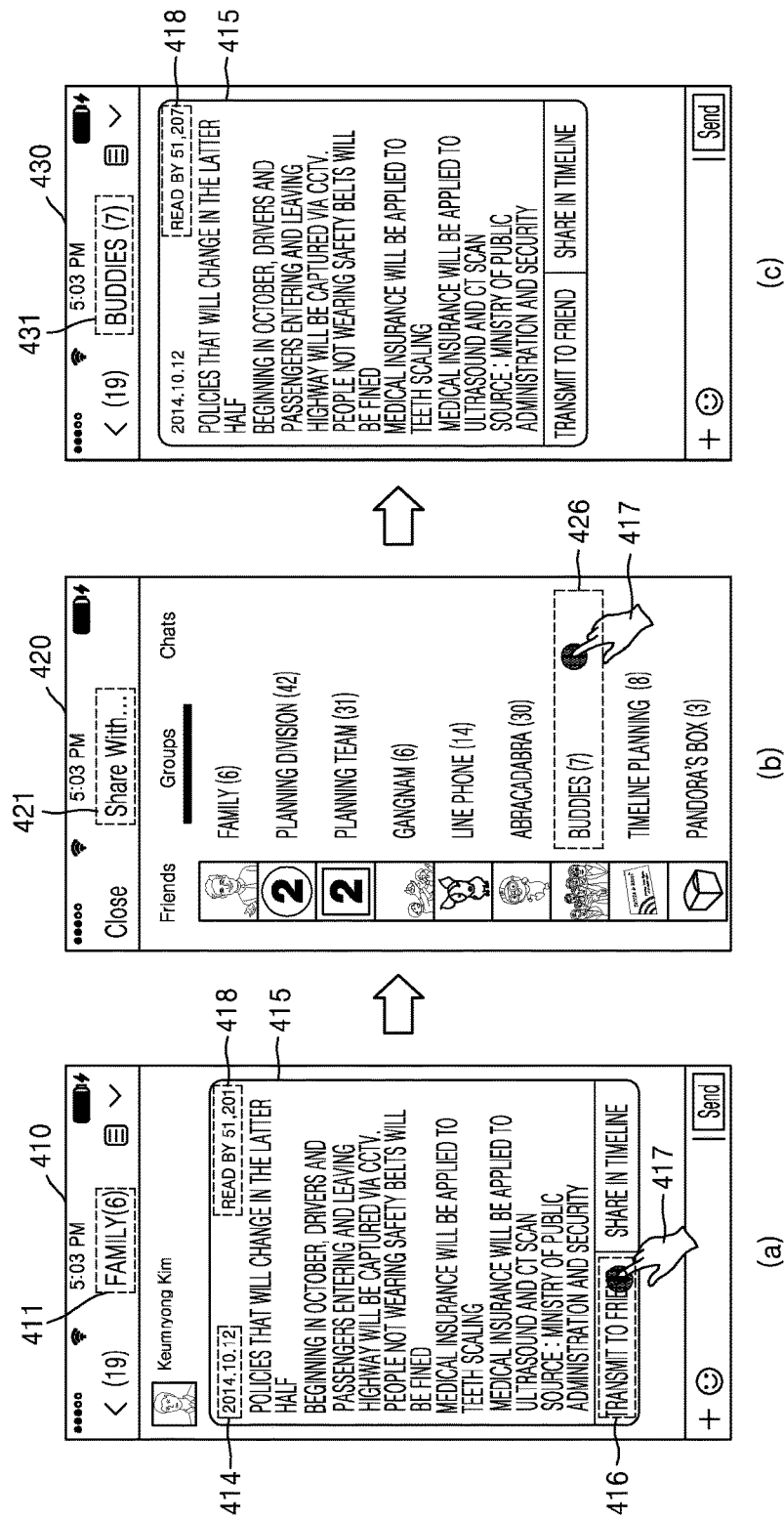
FIG. 4 illustrates examples of a screen of a user terminal of FIG. 1, in which a terminal application is executed.

FIG. 4 illustrates examples of a screen of the user terminal 300 of FIG. 1, in which a terminal application is executed.

Referring to FIG. 4(*a*), a chat window 411 of a current chat group is displayed on the user terminal 300, as a first screen 410. A document 415 is displayed in the chat window 411, wherein the document 415 includes, as well as details of the document 415, a document prepared time 414, a document transmitting interface 416, and a document shared status 418. For example, regarding the chat window 411 of the current chat group named 'family' in which the number of members is six, the document 415 about 'Policies that will change in the latter half' is displayed, and based on details of the document 415, the document prepared time 414, such as 'Oct. 12, 2014', is displayed at the left top, the document transmitting interface 416, such as 'transmit to friend', is displayed at the left bottom, and the document shared status 418 indicating that '51,201' people have read is displayed at the right top.

When a user 417 selects the document transmitting interface 416, a chat group selecting window 421 for selecting a chat group to which the document 415 is to be transmitted is displayed as a second screen 420, as shown in FIG. 4(*b*). For example, the chat group selecting window 421 may display, in a form of a list, names of chat groups, such as 'family', 'planning division', and 'planning team', together with the number of members in the chat groups.

When the user 417 selects a chat group 426 to which the document 415 is to be transmitted from the chat group selecting window 421, a chat window 431 of the chat group 426 is displayed as a third screen 430, as shown in FIG. 4(*c*). the document 415 that was displayed in the chat window 411 is transmitted to and displayed in the chat window 431, and the document shared status 418 is updated and displayed. For example, when the user 417 selects the chat group 426 named 'buddies' in which the number of members is seven, the document 415 may be transmitted to and displayed in the chat window 431. In addition, the number of members who read the document 415 in the first screen 410 was '51,201', but as the user 417 transmits the document 415, the document 415 is further read by six members (excluding the user 417) in the chat group 426, and thus the number of members who read the document 415 may be increased to 51,207.

As such, when the user 417 selects the document transmitting interface 416 with respect to the document 415 displayed in the chat window 411 of the current chat group and then selects the chat group 426 from the chat group selecting window 421, the document 415 is transmitted to and displayed in the chat window 431 of the chat group 426, and the document shared status 418 of the document 415 is updated and displayed.

Figure 5:
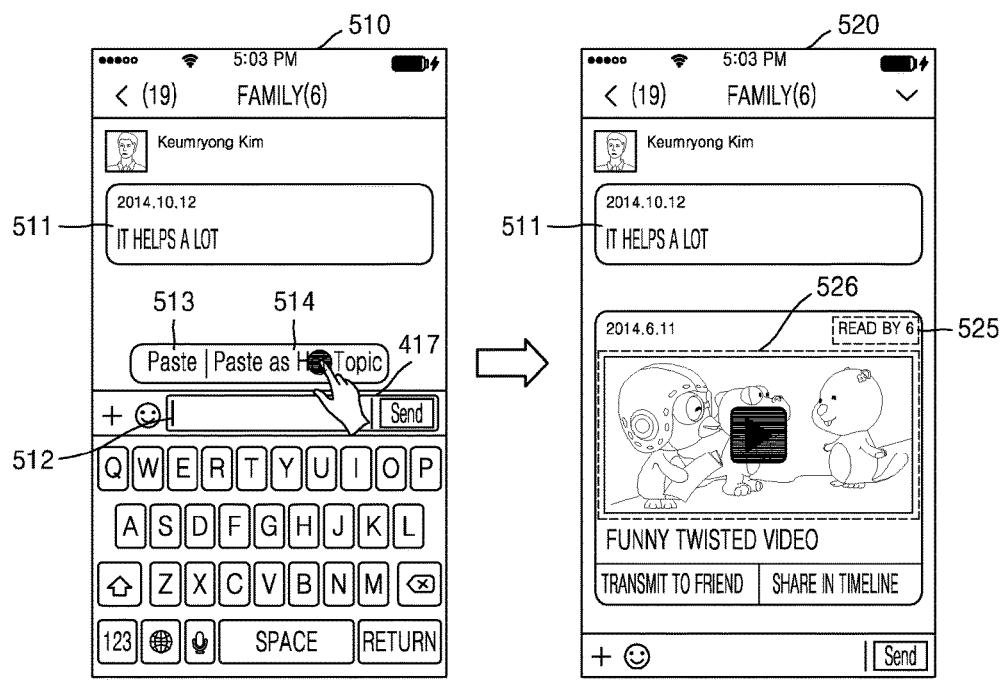
FIG. 5 illustrates other examples of the screen of the user terminal of FIG. 1, in which the terminal application is executed.

FIG. 5 illustrates other examples of the screen of the user terminal 300 of FIG. 1, in which the terminal application is executed.

Referring to FIG. 5, a chat window of a current chat group is displayed on the user terminal 300, as a first screen 510. An instant message 511 may be displayed in the chat window. For example, the instant message 511 'it helps a lot ;)' may be displayed in the chat window of the current chat group named 'family'.

The user 417 may paste copied details in a clipboard of the user terminal 300 as an instant message or a document. For example, the user 417 may select a chat input box 512, and when there is the copied details in the clipboard, a 'paste' interface 513 for pasting the copied details as an instant message, and a 'paste as hot topic' interface 514 for pasting the copied details as a document, may be additionally displayed above the chat input box 512.

When the user 417 selects the 'paste' interface 513, text or an image included in the coped details is pasted as an instant message, and when the user 417 selects the 'paste as hot topic' interface 514, a document 525 may be pasted at the bottom of the instant message 511 in the chat window as shown in a second screen 520.

When the document 525 is pasted, text, an emoticon, multimedia content, and a web API included in the copied details may be pre-converted to a format compatible with the chat window and thus members of the current chat group are able to immediately view the document 525 in the chat window without having to move to a separate window. For example, a video 526 included in the document 525 may be immediately reproduced in the chat window by being pre-converted to match a size of the chat window.

As such, the document 525 may be shared between the members of the current chat group as the user 417 pastes the document 525 in the chat window on which the instant message 511 is displayed.

Figure 6:
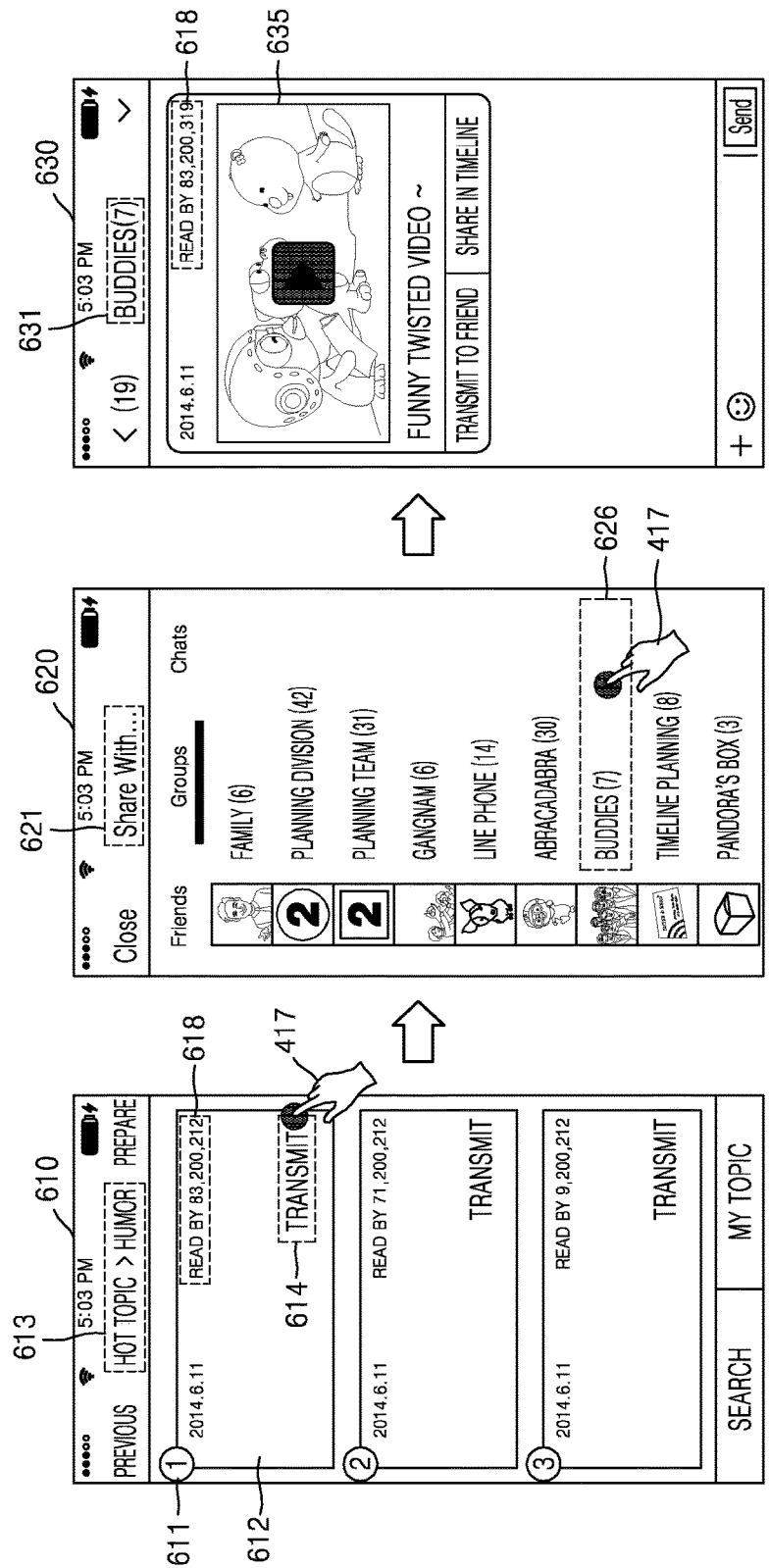
FIG. 6 illustrates other examples of the screen of the user terminal of FIG. 1, in which the terminal application is executed.

FIG. 6 illustrates other examples of the screen of the user terminal 300 of FIG. 1, in which the terminal application is executed.

Referring to FIG. 6, a popular document list 613 is displayed on the user terminal 300, as a first screen 610. Popular documents may be displayed in the popular document list 613 and arranged based on ranks assigned thereto. For example, in the popular document list 613, ranks may be assigned to documents in a 'humor' category based on the number of members who read each document. Regarding a popular document 612, since a number 618 of all members who read the popular document 612 is '83,200,212', e.g., the highest, from among the documents in the 'humor' category, the popular document 612 is displayed at the top of the popular document list 613, as the first ranking 611.

When the user 417 selects a document transmitting interface 614 displayed together with the popular document 612, a chat group selecting window 621 for selecting a chat group to which the popular document 612 is to be transmitted is displayed as a second screen 620.

When the user 417 selects a chat group 626 to which the popular document 612 is to be transmitted from the chat group selecting window 621, a chat window 631 of the chat group 626 is displayed as a third screen 630. The popular document 612 is transmitted to and displayed on the chant window 631 in a chat window format 635, and the number 618 of all members who read the popular document 612 is updated to '83,200,319'.

For example, while the popular document 612 is transmitted to the chat group 626, the popular document 612 may be further read by 100 members other than seven members of the chat group 626, and thus the number 618 may be updated to indicate that 107 additional members read the document 612 in comparison to the first screen 610.

As such, when the user 417 selects the document transmitting interface 614 regarding the popular document 612 displayed in the popular document list 613 and then selects the chat group 626 from the chat group selecting window 621, the popular document 612 is transmitted to and displayed in the chat window 631 of the chat group 626, and the number 618 is updated and displayed.

Figure 7:
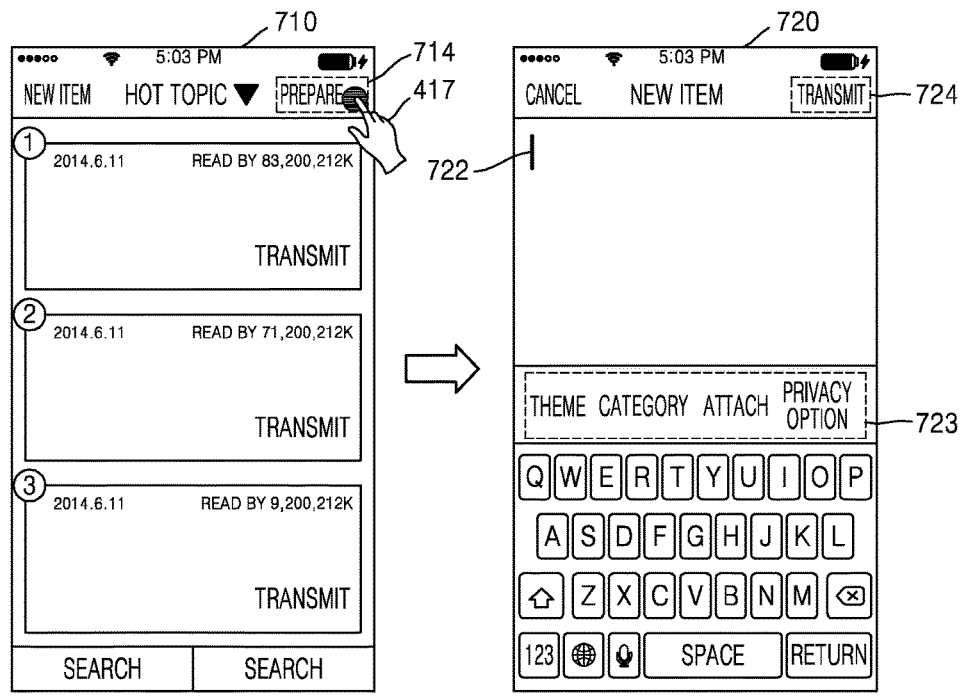
FIG. 7 illustrates other examples of the screen of the user terminal of FIG. 1, in which the terminal application is executed.

FIG. 7 illustrates other examples of the screen of the user terminal 300 of FIG. 1, in which the terminal application is executed.

Referring to FIG. 7, a popular document list is displayed on the user terminal 300 as a first screen 710. A document preparing interface 714 is displayed at a title display bar of the popular document list.

When the user 417 selects the document preparing interface 714, a document preparing window is displayed as a second screen 720. The user 417 may type text into a document input box 722. A menu bar 723 is further displayed in the document preparing window, wherein the menu bar 723 includes a theme setting interface, a category setting interface, an attachment adding interface, and a private option setting interface. According to an interface of the menu bar 723 selected by the user 417, a theme or a category of a document being prepared may be set, an attachment may be added to the document being prepared, or a degree of privacy of the document being prepared may be set.

When the user 417 selects a document transmitting interface 724 displayed on the title display bar of the document preparing window after preparing a document, a window for selecting a chat group to which the document is to be transmitted is displayed as shown in FIG. 4 or 6.

As such, the user 417 may transmit a personally prepared document to be shared between members of a chat group.

According to a method of providing a document sharing service, according to one or more example embodiments described above, a selected document is provided by facilitating document sharing through a chat window of a chat group such that only a document of interests of the chat group is shared with a user, and a shared status of a document transmitted through a chat window is accumulated and provided together with the transmitted document such that a user who shares a document conveniently recognizes a shared status of the shared document.

According to an apparatus for providing a document sharing service based on a messaging service, and a method of using the apparatus, according to one or more example embodiments, a shared status of a document transmitted through a chat window is accumulated and provided together with the transmitted document such that a user who shares a document conveniently recognizes a shared status of the shared document.

The methods described above may be recorded on a computer-readable recording medium by being realized in computer programs executed by using various computers. The computer-readable recording medium may include at least one of a program command, a data file, and a data structure. The program commands recorded in the computer-readable recording medium may be specially designed or well known to one of ordinary skill in the computer software field. Examples of the computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter. The hardware device may be configured to operate as at least one software module to perform operations of the methods, or vice versa.

The particular implementations shown and described herein are illustrative example embodiments of the present disclosure and are not intended to otherwise limit the scope of the present disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of example embodiments unless the element is specifically described as "essential" or "critical".

While one or more example embodiments have been described with reference to the figures, it will be understood by those of ordinary skill in the art that various changes in form and details may be made therein without departing from the spirit and scope of the inventive concept as defined by the following claims.

What is claimed is:

1. An apparatus for providing a document sharing service based on a messaging service, the apparatus comprising:
    a memory configured to store computer readable instructions; and
    a processor configured to execute the computer readable instructions to
        receive a document transmission signal for transmitting a document displayed in a chat window of a first chat group from a first terminal application corresponding to a member of the first chat group, to a second chat group via second terminal applications respectively corresponding to members of the second chat group, the second chat group being different from the first chat group,
        obtain a document identifier from the document transmission signal,
        retrieve a document corresponding to the document identifier,
        transmit the document to the second terminal applications, and
        update shared status information of the document in a database based on a shared status of the document in the second chat group, the shared status information including at least one of a number of users who read the document, and a number of chat groups to which the document is transmitted such that updating of the shared status information includes accumulating, by the processor, at least one of the number of users who read the document and the number of chat groups to which the document is transmitted.

2. The apparatus of claim 1, wherein the processor is configured to execute the computer readable instructions to assign a rank according to a pre-set standard to the document by using the shared status information.

3. The apparatus of claim 2, wherein the processor is configured to execute the computer readable instructions to determine whether the document is set to be public, and assigns the rank to the document only when the document is set to be public.

4. The apparatus of claim 2, wherein the processor is configured to execute the computer readable instructions to generate a ranking list including documents which have been assigned a rank and transmits the ranking list to the first terminal application.

5. The apparatus of claim 4, wherein the processor is configured to execute the computer readable instructions to receive the document transmission signal for transmitting one of the documents included in the ranking list from the first terminal application to the second terminal applications respectively corresponding to the members of the second chat group.

6. The apparatus of claim 1, wherein the shared status information comprises a number of all users who read the document, and
    the processor is configured to execute the computer readable instructions to update the number of all users who read the document by collecting an identifier of a member who read the document from among the members of the second chat group.

7. The apparatus of claim 1, wherein the processor is further configured to execute the computer readable instructions to:
    transmit the updated shared status information of the document to the first terminal application and the second terminal application; and
    display the document in a chat window of the second chat group, together with the shared status information of the document.

8. The apparatus of claim 1, wherein the processor is further configured to execute the computer readable instructions to pre-convert the document to a format compatible with the chat window such that the document and an instant message are displayable together in the chat window in the first terminal application.

9. A non-transitory computer-readable recording medium storing instructions that, when executed by a processor, cause the processor to,
    receive a document transmission signal for transmitting a document displayed in a chat window of a first chat group from a first terminal application corresponding to a member of the first chat group, to a second chat group via second terminal applications respectively corresponding to members of the second chat group, the second chat group being different from the first chat group,
    obtain a document identifier from the document transmission signal,
    retrieve a document corresponding to the document identifier,
    transmit the document to the second terminal applications, and
    update shared status information of the document in a database based on a shared status of the document in the second chat group, the shared status information including at least one of a number of users who read the document, and a number of chat groups to which the document is transmitted such that updating of the shared status information includes accumulating, by the processor, at least one of the number of users who read the document and the number of chat groups to which the document is transmitted.

* * * * *